United States Patent
Burger

(10) Patent No.: US 7,139,380 B2
(45) Date of Patent: Nov. 21, 2006

(54) SYSTEM AND METHOD FOR PERFORMING SIGNALING-PLAN-SPECIFIC CALL PROGRESS ANALYSIS

(75) Inventor: Eric W. Burger, Amherst, NH (US)

(73) Assignee: Snowshore Networks, Inc., Chelmsford, MA (US)

( * ) Notice: Subject to any disclaimer, the term of this patent is extended or adjusted under 35 U.S.C. 154(b) by 867 days.

(21) Appl. No.: 10/103,918

(22) Filed: Mar. 22, 2002

(65) Prior Publication Data

US 2002/0176557 A1 Nov. 28, 2002

Related U.S. Application Data

(60) Provisional application No. 60/278,813, filed on Mar. 26, 2001.

(51) Int. Cl.
  H04M 3/42 (2006.01)
  H04M 11/00 (2006.01)
  H04M 1/00 (2006.01)
  H04M 3/00 (2006.01)
  H04J 1/02 (2006.01)

(52) U.S. Cl. .......................... 379/207.02; 379/100.14; 379/359; 379/386; 370/493

(58) Field of Classification Search ........... 379/207.02, 379/386, 100.14, 359; 370/465, 466, 410, 370/493; 704/213
See application file for complete search history.

(56) References Cited

U.S. PATENT DOCUMENTS

| | | | |
|---|---|---|---|
| 4,805,212 A * | 2/1989 | Hase et al. | 379/359 |
| 5,007,000 A * | 4/1991 | Baldi | 704/213 |
| 5,023,906 A | 6/1991 | Novas | 379/372 |
| 5,101,428 A * | 3/1992 | Koue | 379/100.14 |
| 5,325,425 A | 6/1994 | Novas et al. | 379/100 |
| 5,521,967 A | 5/1996 | Novas et al. | 379/100 |
| 5,608,786 A | 3/1997 | Gordon | 379/100 |
| 5,659,542 A | 8/1997 | Bell et al. | 370/496 |
| 5,838,683 A | 11/1998 | Corley et al. | 370/408 |
| 5,862,203 A | 1/1999 | Wulkan et al. | 379/114 |
| H1802 H | 9/1999 | Erwin et al. | 379/243 |
| 6,069,939 A | 5/2000 | Fung et al. | 379/67.1 |

(Continued)

OTHER PUBLICATIONS

IETF Network Working Group RFC 2543, "Session Initiation Protocol," Mar. 1999.

(Continued)

*Primary Examiner*—Wing Chan
*Assistant Examiner*—Thjuan P. Knowlin
(74) *Attorney, Agent, or Firm*—Weingarten, Schurgin, Gagnebin & Lebovici LLP

(57) ABSTRACT

Call progress analysis is performed in a telephone system employing different in-band signaling plans are used. From address information for a call destination in a call initiation message, it is determined which type of in-band signaling plans is utilized by equipment associated with the call destination, for example by examining country codes in a dialed telephone number. Based upon the determined signaling plan type, a corresponding type of call progress analysis resource is selected and allocated for use with the call. The analysis resource may include a digital signal processor (DSP) programmed with an analysis routine tailored to the determined signaling plan. The DSP may be pre-programmed with such a routine or may be loaded at call time with analysis parameters appropriate to the signaling plan. The telephone system may employ a packet network and packet-based telephony transmission, a media gateway controller or a Session Initiation Protocol (SIP) proxy server, an a media server. A telephone network employing more traditional time-division-multiplexed (TDM) based media transmission may also be utilized.

24 Claims, 3 Drawing Sheets

U.S. PATENT DOCUMENTS

| | | | |
|---|---|---|---|
| 6,173,054 B1 * | 1/2001 | Beyda et al. | 379/386 |
| 6,188,751 B1 | 2/2001 | Scherer | 379/88.22 |
| 6,430,195 B1 * | 8/2002 | Christie et al. | 370/465 |
| 6,560,241 B1 * | 5/2003 | Christie et al. | 370/466 |
| 6,765,931 B1 * | 7/2004 | Rabenko et al. | 370/493 |
| 6,885,671 B1 * | 4/2005 | Wiley et al. | 370/410 |

OTHER PUBLICATIONS

IETF Network Working Group RFC 2705, "Media Gateway Control Protocol," Oct. 1999.

\* cited by examiner

SYSTEM AND METHOD FOR PERFORMING SIGNALING-PLAN-SPECIFIC CALL PROGRESS ANALYSIS

CROSS REFERENCE TO RELATED APPLICATIONS

This application claims priority under 35 U.S.C. §119(e) of U.S. Provisional Patent Application No. 60/278,813 filed Mar. 26, 2001.

STATEMENT REGARDING FEDERALLY SPONSORED RESEARCH OR DEVELOPMENT

Not Applicable

BACKGROUND OF THE INVENTION

The present invention is related to the field of telephone systems, and more particularly to automated call progress monitoring based on analog signaling information utilized in telephone systems.

Many modern telephone systems employ digital out-of-band signaling among system components in setting up, monitoring, and terminating connections for a telephone call. Although analog signaling tones such as ringing tone, dial tone, etc. are still utilized in such modern systems, they are used only at the edges of the network for the benefit of the participants in a call. Within the network, signaling information is passed in the form of digital messages that are processed by digital processing circuitry at the various system components. In the Signaling System 7 network, for example, a serving switch can send a data packet describing the real-time call progress. A serving SS7 switch can send ALERTING, BUSY, or INVALID messages to a calling SS7 switch. Likewise, in ISDN networks or networks employing Q. 931 signaling, a private branch exchange (PBX) can signal the network regarding the appropriate call progress state for a given call. The use of digital processors and signaling provides numerous benefits, including the ability to provide a variety of feature-rich services.

However, digital signaling is not yet ubiquitous in the global public switched telephony network. Even in the United States, there are still analog end office switches such as the AT&T/Lucent 1AESS, as well as analog PBXs, which have no provision for digital call progress signaling. In many other countries, analog switching and signaling equipment is still more the rule than the exception. Additionally, digital signaling capability within the network may be selectively disabled or otherwise unavailable for legal or contractual reasons. Even if a terminating service provider is capable of deploying equipment that can perform call progress analysis, it may choose not to. When digital signaling is unavailable, an originating service provider would like to perform call progress analysis to be able to provide accurate bills to its subscribers.

At present, when a call is placed to an analog far end switch, the network opens a "bearer channel" from the caller to the switch, and the far end switch generates analog call progress tones in the bearer channel. Examples of the signals being conveyed by these analog tones include ringback, busy, and special information tone (SIT). As an example of the format of these signals, the ringback signal in the U.S. takes the form of a combined 350 Hz tone and 440 Hz tone, with a cadence of 2 seconds on and 4 seconds off. The signal tones are interpreted by the caller, and in some cases may also be detected by electronic circuitry coupled to the channel. Once the called party answers, the serving switch issues answer supervision signaling, which is the start of billing in the U.S.

The above approach to monitoring the call progress in the absence of digital signaling has a serious drawback, which is the potential for toll fraud. A PBX can be programmed to never issue answer supervision. During the initial part of a call, the path between the caller and the called party is opened for the purpose of conveying the initial analog "media", which includes analog signaling tones as well as the initial utterances of a called party when he or she answers the phone. This media connection is initially free, and only becomes subject to charges after the telephone system deduces that the call has been answered (i.e., answer supervision has been issued and detected). If answer supervision is never issued or detected, this path can be used for the entire call without either party incurring charges. From the point of view of the caller and called party, they have a regular telephone call. However, in the absence of answer supervision, the service provider is unaware that a billable call has occurred.

There are two approaches to solving this problem. The first is to limit the media path or the duration of the free initial portion of the call, either by disconnecting after a certain period of time or by charging for a call as if answer supervision had been issued after a certain period of time. This approach is in widespread use. The second approach is to employ circuitry to monitor call progress by examining the far-end media stream, and to utilize the information gleaned from such monitoring to detect when a call has been answered, as well as other important call progress states. The output of such monitoring circuitry can serve in place of far-end answer supervision, reducing the possibility of toll fraud.

The monitoring of call progress by using electronic circuitry to analyze analog signaling tones is known in the art, and is shown for example in U.S. Pat. Nos. 5,023,906, 5,325,425 and 5,521,967 of Novas et al. Generally, any such circuitry must be capable of recognizing the presence or absence of certain analog tones, which may appear in combination. Additionally, the circuitry must be able to recognize tone duration and cadence, and further must have some awareness of the stage of each call being analyzed. This need can be appreciated by considering the use of dial tone. At the beginning of a call, the presence of a dial tone is necessary for dialing to proceed, whereas the presence of dial tone later in the call likely indicates that the call has terminated or otherwise failed. Call progress analysis circuitry must be capable of distinguishing between these and other cases.

There can be drawbacks to the use of call progress analysis such as described above. In the system of Novas et al., for example, the call progress analysis circuitry is part of specialized customer premises calling equipment. Although the cost and complexity of this specialized equipment may be justified for some customers having corresponding special needs, this is not true for many customers. Additionally, the Novas et al. patents do not address the use of call progress analysis in the context of global calling, in which different analog signaling plans are utilized by far-end equipment residing in different countries. The Novas et al. patents describe operation based on an assumed signaling plan, such as the signaling plan used in the United States. An analysis process based on the U.S. signaling plan would be problematic if used on a call placed to Japan, for example. Japanese ring-back sounds similar to U.S. busy tone, and therefore the system of Novas et al. might mistakenly conclude that the line to a called party in Japan is busy when in fact it is ringing.

What is needed is a method of performing call progress analysis on a media stream that operates properly in conjunction with different call progress signaling plans, and that can be deployed for use by a variety of telephone customers in a cost-effective manner.

BRIEF SUMMARY OF THE INVENTION

In accordance with the present invention, a method and apparatus are disclosed for performing call progress analysis in a telephone system in which different types of in-band signaling plans are used.

The method includes determining, from address information for a call destination contained in a call initiation message, which of different types of in-band signaling plans is utilized by equipment associated with the call destination. This determination may take the form, for example, of examining country codes in a dialed telephone number, and thereby ascertaining which of different country-specific signaling plans may be used by far-end equipment involved in the call. Then, based upon the determination of the signaling plan type, a corresponding type of call progress analysis resource is selected and allocated for use with the call. The analysis resource may include a digital signal processor (DSP), for example, programmed with an analysis routine tailored to the signaling plan of interest. The DSP may be pre-programmed with such a routine, in which case it can simply be allocated to the call, or it may be necessary to program an unprogrammed DSP with a set of analysis parameters appropriate to the signaling plan of the far end equipment.

A disclosed telephone system employs a packet network and packet-based telephony transmission. Pertinent functions are provided by a media gateway controller or a device known as a Session Initiation Protocol (SIP) proxy server, in conjunction with a media processing function such as a media server. The disclosed technique may also be realized in a telephone network employing more traditional time-division-multiplexed (TDM) based media transmission.

Other aspects, features, and advantages of the present invention will be apparent from the detailed description that follows.

BRIEF DESCRIPTION OF THE SEVERAL VIEWS OF THE DRAWING

The invention will be more fully understood by reference to the following Detailed Description of the Invention in conjunction with the Drawing, of which.

DETAILED DESCRIPTION OF THE INVENTION

Figure 1:
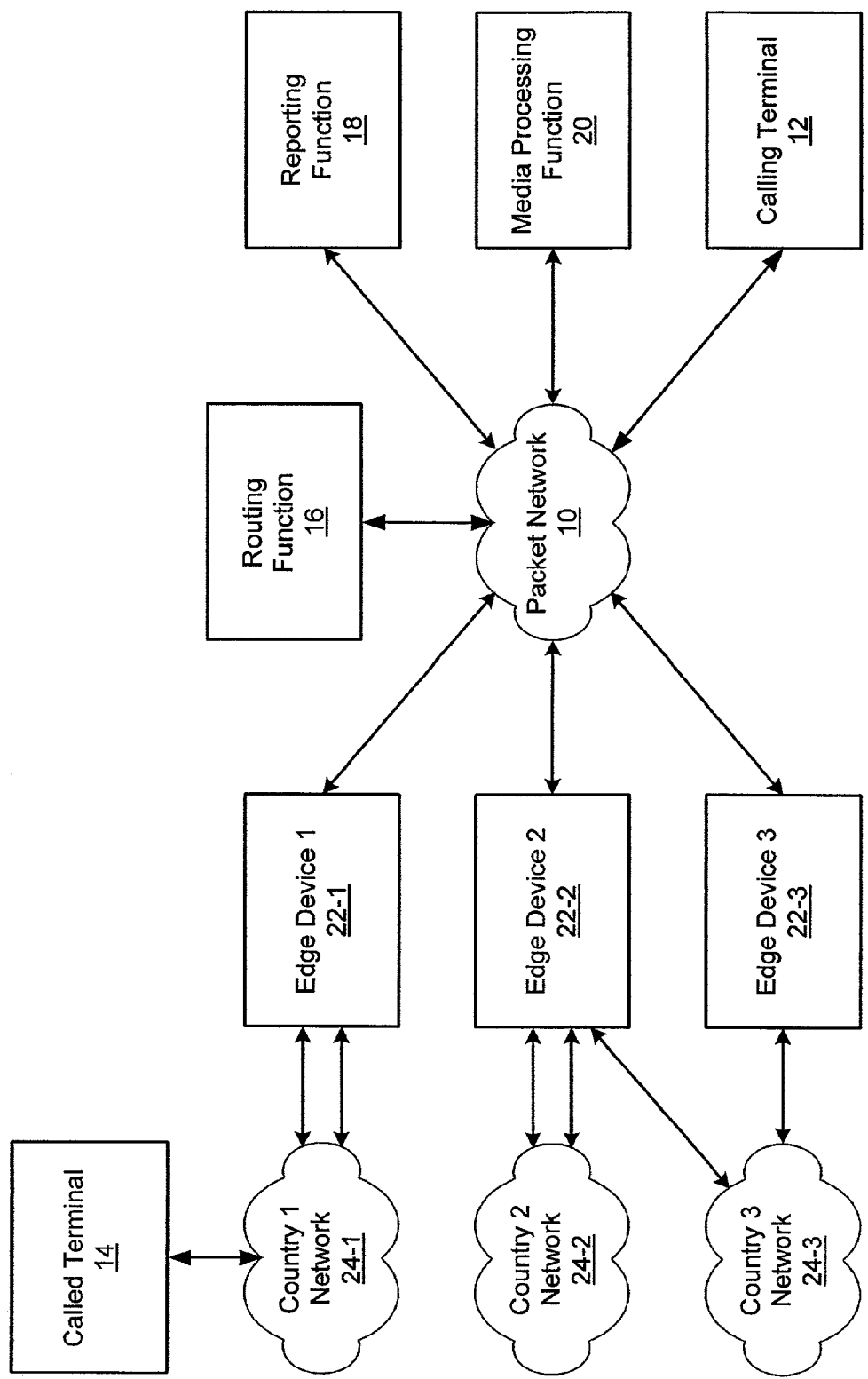
FIG. 1 is a block diagram of a generalized first type of telephone system utilizing call progress analysis in accordance with the present invention.

In FIG. 1, a packet network 10 provides telephone services using packet-based transmission. In particular, the packet network 10 provides telephone service between a calling terminal 12 and a called terminal 14. Also connected to the packet network 14 are components performing a routing function 16, a reporting function 18, and a media processing function 20. These functions are described below, along with different physical embodiments.

It is assumed that the packet network 10, the calling terminal 12 and the functions 16–20 fall under a given national or regional telephone administration plan, such as that of North America. The packet network 10 is interconnected by edge devices 22-1, 22-2 and 22-3 with corresponding networks 24-1, 24-2 and 24-3 falling under the administration plans of other countries or regions. For example, the country 1 network 24-1 may be the telephone network of Japan, while the country 2 network 24-2 may be that of Europe. As shown, the called terminal 14 is connected to country 1 network 24-1. The edge devices 22 may be media gateways or access switches. Trunks from multiple country networks 24 may feed a single access device 22, such as the connections between country 3 network 24-3 and edge device 22-2 as shown.

It is assumed that a user at the calling terminal 12 wishes to place a call to a user at the called terminal 14. If the target country network 24-1 provides digital call progress signaling, then this form of signaling is assumed to be utilized throughout the network. However, if the country network 24-1 provides only in-band call progress tones, then the method described below may be utilized.

The calling terminal 12 initiates a call by issuing a call initiation message that invokes the routing function 16. In one embodiment, the routing function 16 can be a Session Initiation Protocol (SIP) Proxy Server that intercepts calls placed to non-digital signaling networks, such as country 1 network 24-1 is assumed to be. The routing function 16 examines the dialed telephone number or other addressing information in the message from the calling terminal 12 to ascertain whether the call is directed to one of the country networks 24 that utilizes an analog call progress signaling plan. Upon finding this to be the case, the routing function 16 initiates a call on behalf of the calling terminal 12 to establish a media connection between the called terminal 14 and the media processing function 20. For example, the routing function 16 can use a SIP INVITE message between the edge device 22-1 and the media processing function 20. The SIP INVITE message includes addressing information that indicates the target country network 24-1. The addressing information may take the form of a telephone number, which generally includes a country code as is known. More generally, the addressing information may be in the form of an alphanumeric string, such as "bob@workplace.com", which is translatable within the network to a physical address of a corresponding called terminal 14. The recipient of the INVITE message may also ascertain the identity of the destination country based on a specific country designator contained in the message.

Alternatively, the routing function 16 can be a media gateway controller (MGC), such as described in an International SoftSwitch Consortium (ISC) document entitled "Softswitch Architecture" found at http://www.softswitch.org/. The MGC version of the routing function 16 establishes the media connection between the edge device 22-1 and the media processing function 20 using a protocol such as the Media Gateway Control Protocol (MGCP), described in ITU-T Recommendation J.162 (March 2001), Prepublished, "Network call signaling protocol for the delivery of time critical services over cable television networks using cable modems", and in Arango, et. al., "Media Gateway Control Protocol (MGCP)—Version 1.0", IETF Informational RFC 2705, October 1999. Alternatively, ITU-T Recommendation H.248 (June 2000), "Gateway Control Protocol", can be utilized. In this case, the target country network 24-1 is identified to the media processing function 20 by signaling from the routing function 16.

Based on the identity of the destination country network 24 (e.g. country 1 network 24-1) as signaled from the routing function 16, the media processing function 20 dynamically allocates a call progress analysis resource that is properly configured to analyze the corresponding in-band tones. This resource is preferably a digital signal processor (not shown) programmed with the appropriate analysis routine. Once the target country network 24 and its signaling plan have been identified, the analysis based on this signaling plan can be conducted in any of a variety of ways, and may employ for example techniques shown in the above-referenced Novas et al. patents.

On successful analysis of the call progress tones presented in-band in the stream, the media processing function 20 reports the current call progress to a reporting function 18. The reporting function 18 indicates to the routing function 16 the state of the call. At this point, the routing function 16 can report the current call progress to the calling terminal 12. For example, in the SIP protocol, the call routing function 20 can send "180 Ringing", "486 Busy Here", or "480 Temporarily Not Available". On the unsuccessful call states, such as busy or network congestion, the routing function 16 may simply signal the state of the call to the calling terminal 12 and instruct the media processing function 20 to disconnect the stream from the edge device 22-1. If the media processing function 20 detects voice energy, fax tone, or some other indication that the call has successfully connected, this is indicated to the reporting function 18, which in turn notifies the routing function 16 that the call is successful. At this point, the routing function 16 can direct the edge device 22-1 to connect the media stream directly to the calling terminal 12. When embodied as a SIP proxy server, the routing function 16 accomplishes this by performing a re-INVITE to the edge device 22-1.

In order to ensure that the calling terminal 12 receives all of the initial vocalizations of the called party, the routing function 16 can, during call setup, signal the media processing function 20 to relay media received from the edge device 22-1 to the calling terminal 12. The routing function 16 can set this media stream up as a one way stream from the media processing function 20 to the calling terminal 12 to reduce toll fraud.

The calling terminal 12 and called terminal 14 may use different media formats, in which case some form of real-time transcoding is necessary for the duration of the call. One benefit of using a dedicated media processing function 20 in the media stream is that functions such as transcoding can be performed in addition to call progress analysis. When performing transcoding, the media processing function 20 does not drop out of the media stream upon occurrence of answer supervision. Rather, it establishes and maintains full-duplex connections between itself and the calling and called terminals 12 and 14, performing the appropriate media conversions to enable the conversation to occur.

As described below, in some embodiments the routing function 16 and reporting function 18 reside on different hardware platforms. However, because of the relatively high degree of interaction between these functions, it may be advantageous in some embodiments for these functions to be combined. Additionally, this same consideration may apply to combinations of the reporting function 18 and media processing function 20, i.e., it may be advantageous in different embodiments to either separate or combine these functions.

In the foregoing, it is assumed that the routing function 16 and/or the media processing function 20 have been pre-provisioned with information enabling the detection of the need for analog call progress analysis based on a dialed telephone number or other destination address information. In alternative embodiments, it may be advantageous to detect the need for analog call progress analysis in a more dynamic manner. For example, analog call progress analysis may be initiated by default, and then terminated upon detection of digital call progress signaling.

Additionally, it may be possible to glean useful information from the messaging traffic in the packet network 10. For example, it is possible for a SIP device to indicate a language preference in a response to a SIP INVITE message. The routing function 16 could potentially use such a language preference to infer whether the country network 24 of the called terminal 14 may require the use of analog call progress analysis.

Figure 2:
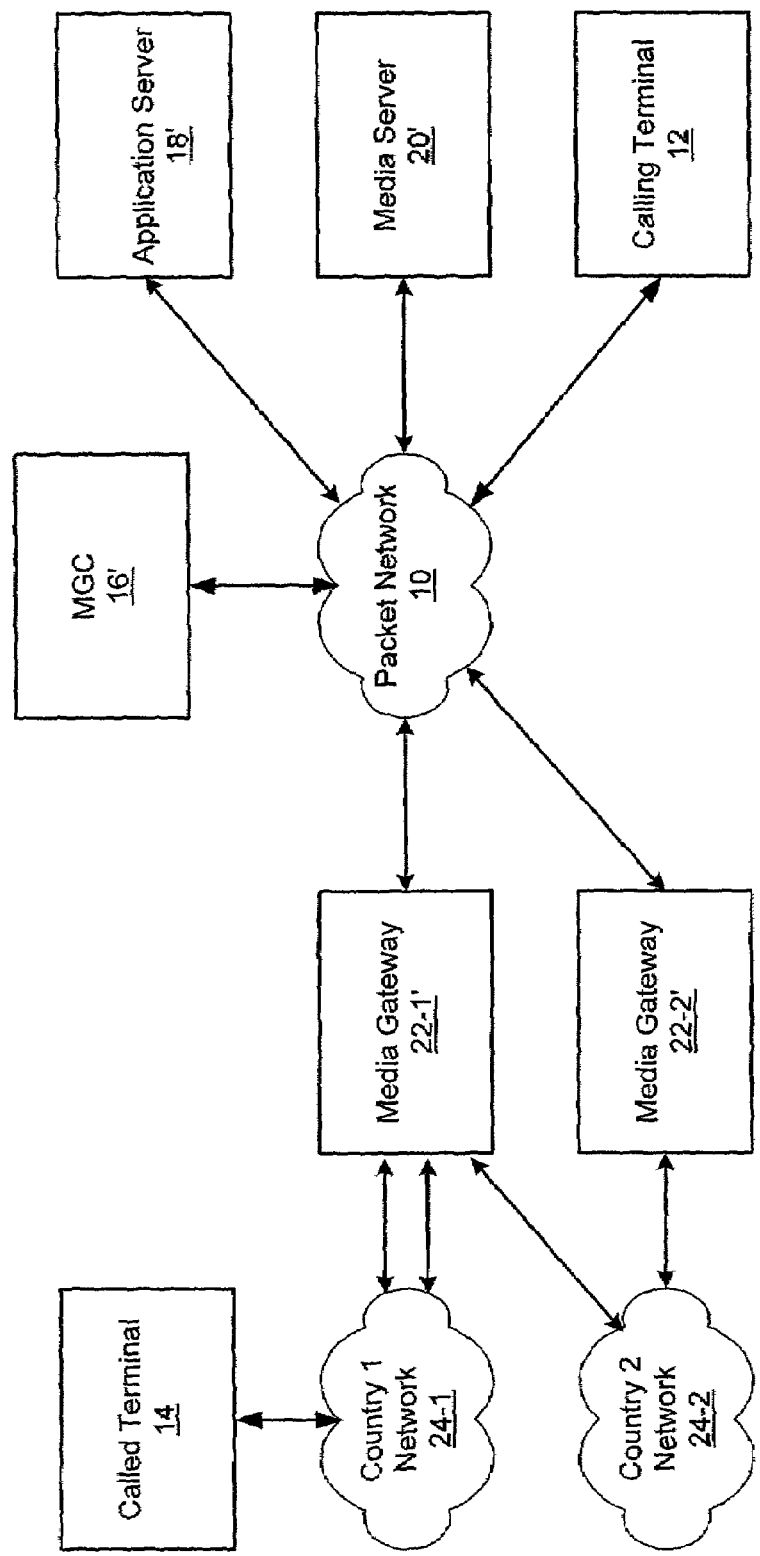
FIG. 2 is a block diagram of a more specific version of the first type of telephone system of FIG. 1.

FIG. 2 shows a more specific embodiment in which the edge devices 22 are constituted by media gateways 22-1' and 22-2', the routing function is constituted by a media gateway controller (MGC) 16', the reporting function 18 is constituted by an application server 18', and the media processing function 20 is constituted by a media server 20'. In this embodiment, the calling terminal 12 issues a SIP INVITE containing the address of the called terminal 14. Acting as an egress SIP proxy server, the MGC 16' intercepts the SIP INVITE. On detecting the destination country, the MGC 16' issues a SIP INVITE on behalf of the application server 18' to the media gateway 22-1'. The application server 18' may be a general purpose computer running an application employing telephony, such as a Web application or voice-mail, for example. The application server 18', acting as a back-to-back SIP user agent, issues an INVITE to the media server 20'. The media server 20 acknowledges this INVITE with a message identifying a media port of the media server 20' that is available to receive media for processing. The application server 18' then re-INVITES the media gateway 22-1' with the identity of this media port of the media server 20'.

During the call setup, the media server 20' analyzes a called party ID field of the SIP INVITE to determine the country network 24 to which the called terminal 14 is connected. Using this information, the media server 20' may look up a corresponding set of analysis parameters and load these into a call progress analysis resource (i.e., DSP) assigned to the call. Alternatively, the media server 20' may allocate a call progress analysis resource that has been pre-loaded with the appropriate country parameters. In either event, the media server 20' then connects the media stream to the allocated call progress analysis resource, and analysis proceeds.

A table such as Table 1 below can be used by the media server 20' translate a country code into an identifier of a "resource pool", i.e., a set of one or more DSPs pre-loaded with the appropriate analysis routine for the signaling plan of the indicated country. A table such as Table 2 can be used for loading call analysis parameters into a call progress analysis resource when no pre-loaded resource is available.

TABLE 1

Preloaded Resources

| Country Code | Resource Pool |
|---|---|
| 31 | 3 |
| 32 | 3 |
| 33 | 4 |
| 44 | 5 |
| 1 | 1 |

TABLE 2

Loadable Parameters

| Country Code | Ring Pattern | Busy Pattern | Network Busy Pattern | SIT |
|---|---|---|---|---|
| 31 | 14 | 12 | 23 | 0 |
| 32 | 14 | 12 | 23 | 0 |
| 33 | 27 | 19 | 28 | 7 |
| 44 | 22 | 24 | 12 | 6 |
| 1 | 1 | 2 | 3 | 4 |

Tables 3 and 4 below show the tones and cadences for various signals in the U.S. and Japan, respectively. This information is taken from E.180 Supplement 2, 1/94. Each table entry corresponds to one of the "pattern" codes from Table 2 above. Thus, for example, Busy Pattern "2" from Table 2 corresponds to the combination of 480 Hz and 620 Hz at a 0.5/0.5 cadence used in the U.S.

TABLE 3

U.S. Signaling

| Signal | Frequency (Hz) | Cadence (Seconds) |
|---|---|---|
| Dial Tone | 350 + 440 | (continuous) |
| Ringing Tone | 440 + 480 | 2.0–4.0 |
| Busy Tone | 480 + 620 | 0.5–0.5 |
| Special Info. (SIT) | 950/1400/1800 | 3 × 0.33 |

TABLE 4

Japan Signaling

| Signal | Frequency (Hz) | Cadence (Seconds) |
|---|---|---|
| Dial Tone | 400 | (continuous) |
| Ringing Tone | 400 × 16 | 1.0–2.0 |
| Busy Tone | 400 | 0.5–0.5 |
| Special Info. (SIT) | 400 | 0.1–0.1 |

During the initial call signaling, the media server 20' sends informational updates to the application server 18' as the call progress analysis proceeds. These updates might include, for example, the detection of voice energy on the line or the presence of ring tone. Preferably, if commanded by the application server 18' during call setup, the media server 20' returns the identity of a media port in an information message to enable the calling terminal to hear the initial portion of the media from the far end. The application server 18' then instructs the MGC 16' to acknowledge the initial INVITE from the calling terminal 12 with the media port as the destination port for the original INVITE.

If the media server 20' detects an error condition, such as busy, network congestion, or SIT, it terminates the session by sending the appropriate SIP status code to the application server 18', which forwards that message to the MGC 16' and the calling terminal 12. If the media server 20' detects a successful connection, it sends a "200 OK" message to the application server 18'.

At this point, if the media server 20' is performing transcoding as well as call progress analysis, the application server 18' instructs the MGC 16' to issue a 200 OK message to the calling terminal 12. The MGC 16' issues a re-INVITE to the media server 20' and the calling terminal 12 to establish a two-way connection. If the media server 20' is not performing transcoding, network resources can be saved by having the MGC 16' issue a re-INVITE to the calling terminal 12 to establish a two-way connection directly between the media gateway 22-1' and the calling terminal 12, thus freeing the media server 20' from the call.

Figure 3:
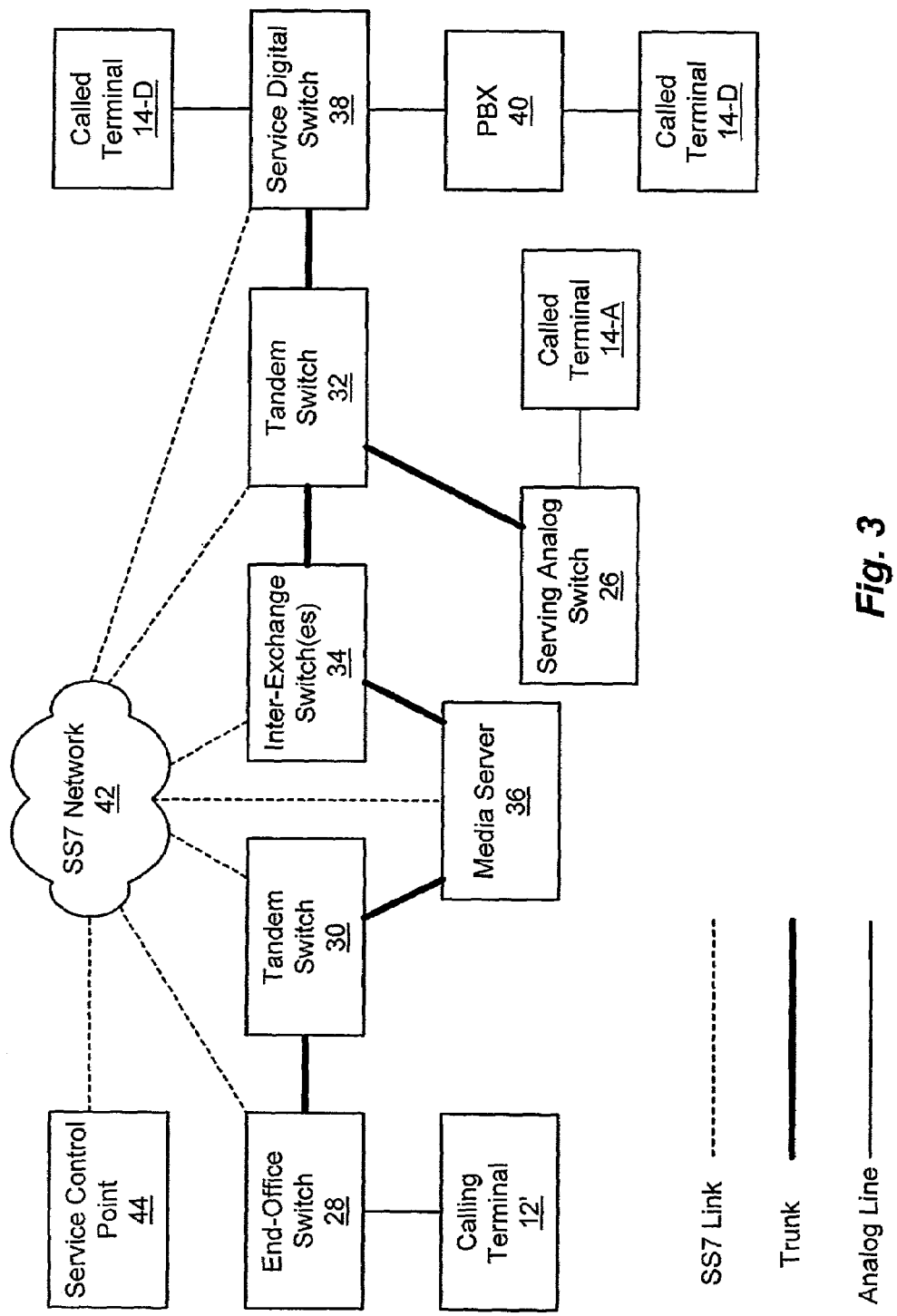
FIG. 3 is a block diagram of a second type of telephone system utilizing call progress analysis in accordance with the present invention.

FIG. 3 shows an alternative embodiment employing a time-division multiplexed (TDM) transmission network rather than the packet network 10 of the embodiments of FIGS. 1 and 2. Here, a calling terminal 12' places a call to a called terminal 14-A connected to an analog serving switch 26. The path between the calling terminal 12' and called terminal 14-A includes an end-office switch 28, tandem switches 30 and 32, and inter-exchange switch(es) 34. Further, a media server 36 forms part of the media path between the tandem switch 30 and the inter-exchange switch 34. As shown, there may also be a digital serving switch 38 and a PBX 40 in the network, these being connected to digital called terminals 14-D. A Signaling System 7 (SS7) network 42, with associated SS7 service control point (SCP) 44, provides interconnection among the various elements for carrying call signaling traffic.

One difference between the configuration of FIG. 3 and a standard TDM network is the connection of the media server 36 between the tandem switch 30 and inter-exchange switch 34. It is necessary to explicitly establish a link from the called terminal 14-A to the media server 36. One method of doing this is for the SCP 44 to intercept the call based on the number dialed and redirect the call to the media server 36. Then the media server 36, acting as an AIN intelligent peripheral of the Advanced Intelligent Network (AIN) as described by "Switch—Intelligent Peripheral Interface (IPI)", GR-1129-CORE, Issue 6, November 2001, establishes a media path between the called terminal 14-A and the media server 36. Simultaneously, either under control of the SCP 44 or independently, the media server 36 establishes a call to the called terminal 14-A and begins call progress analysis. As in embodiments utilizing a packet network 10, such as described above, the media server 36 relays the ear-path from the called terminal 14-A to the calling terminal 12' so that the caller can hear the early media. The media server 36 also passes signaling information to the SCP 44. If the called party answers, the media server 36 can drop out of the call by using procedures such as Two B-Channel Transfer (TBCT), as described by "Generic Requirements for ISDN PRI Two B-Channel Transfer", GR-2865-CORE, Issue 3, May 2000.

For illustrative purposes, in FIG. 3 the media server 36 appears at the edge of the inter-exchange carrier's network. In alternative embodiments, the media server 36 could be located at the customer's premises, within the inter-exchange carrier's network, or in the local exchange carrier's network.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. A method of performing call progress analysis in a telephone system in which different types of in-band signaling tone plans are used, said telephone system including a packet network for providing packet-based transmission of media and signaling traffic, comprising:
   receiving a call initiation message from a call initiator coupled to the packet network;
   performing, by a first node coupled to the packet network, a routing function including determining, from address information for a call destination contained in the call initiation message, which of different types of in-band signaling tone plans is utilized by equipment associated with the call destination; and
   performing, by a second node coupled to the packet network, a media processing function including, based upon the signaling tone plan type determination, selecting a corresponding type of call progress tone analysis resource and allocating the selected call progress tone analysis resource to the call.

2. A method according to claim 1, wherein the signaling tone plan types correspond to different national telephone administration plans.

3. A method according to claim 1, wherein the signaling tone plan types correspond to different national telephone administration plans, and wherein the address information comprises an internationally-recognized country code forming part of a telephone number.

4. A method according to claim 1, wherein the address information comprises an internationally-recognized country code forming part of a telephone number.

5. A method according to claim 1, wherein the address information comprises an alphanumeric string translatable by the telephone system to physical call destination information.

6. A method according to claim 1, wherein the selected resource is one of a plurality of programmable resources, each programmable resource being pre-loaded with a corresponding call progress tone analysis routine.

7. A method according to claim 6, wherein each programmable resource comprises a digital signal processor.

8. A method according to claim 1, wherein the selected resource includes one of a plurality of sets of analysis parameters and a programmable resource, each set of analysis parameters corresponding to a different type of signaling tone plan, and further comprising loading the selected set of parameters into the available programmable resource.

9. A method according to claim 8, wherein the programmable resource comprises a digital signal processor.

10. A method according to claim 1, wherein the call destination and the call initiator employ different media formats, and wherein said media processing function includes transcoding between the different media formats so as to enable the call between the call destination and call initiator to proceed.

11. A telephone system providing analog call progress tone analysis, comprising:
    a packet network operative to provide packet-based transmission of media and signaling traffic;
    a first node coupled to the packet network, the first node being operative to pert on a routing function, the routing function determining, from address information for a call destination contained in a call initiation message received from a call initiator coupled to the packet network, which of different types of in-band signaling tone plans is utilized by equipment associated with the call destination; and
    a second node coupled to the packet network, the second node being operative to perform a media processing function, the media processing function selecting, based upon the signaling tone plan type determination, a corresponding type of call progress tone analysis resource and allocating the selected call progress tone analysis resource to the call.

12. A telephone system according to claim 11, wherein the signaling tone plan types correspond to different national telephone administration plans.

13. A telephone system according to claim 11, wherein the signaling tone plan types correspond to different national telephone administration plans, and wherein the address information comprises an internationally-recognized country code forming part of a telephone number.

14. A telephone system according to claim 11, wherein the address information comprises an internationally-recognized country code forming part of a telephone number.

15. A telephone system according to claim 11, wherein the address information comprises an alphanumeric string translatable by the telephone system to physical call destination information.

16. A telephone system according to claim 11, wherein the selected resource is one of a plurality of programmable resources, each programmable resource being pre-loaded with a corresponding call progress tone analysis routine.

17. A telephone system according to claim 16, wherein each programmable resource comprises a digital signal processor.

18. A telephone system according to claim 11, wherein the selected resource includes one of a plurality of sets of analysis parameters and a programmable resource, each set of analysis parameters corresponding to a different type of signaling tone plan, and further comprising loading the selected set of parameters into the available programmable resource.

19. A telephone system according to claim 18, wherein the programmable resource comprises a digital signal processor.

20. A telephone system according to claim 11, wherein the first and second nodes are separate physical network nodes.

21. A telephone system according to claim 11, wherein the first and second nodes are the same physical network node.

22. A telephone system according to claim 11, further comprising a media gateway coupled to the packet network and to a country network to which the equipment associated with the call destination is also coupled, and wherein the routing function comprises a media gateway controller communicatively coupled to the media gateway to control the operation thereof.

23. A telephone system according to claim 11, wherein the call destination and the call initiator employ different media formats, and wherein the media processing function provides for transcoding between the different media formats so as to enable a call between the call destination and call initiator to proceed.

24. A telephone system providing analog call progress tone analysis, comprising:
    a signaling network operative to provide transmission of call signaling traffic;
    a media network operative to provide time-division-multiplexed based transmission of call media; a controller coupled to the signaling network, the controller being operative to perform a routing function, the routing function determining, from address information for a call destination contained in a call initiation message received from a call initiator, which of different types of in-band signaling tone plans is utilized by equipment associated with the call destination; and a media processing node coupled to the media network, the media processing node being operative to perform a media processing function, the media processing function selecting, based upon the signaling tone plan type determination, a corresponding type of call progress tone analysis resource and allocating the selected call progress tone analysis resource to the call.

* * * * *

UNITED STATES PATENT AND TRADEMARK OFFICE
CERTIFICATE OF CORRECTION

| | | |
|---|---|---|
| PATENT NO. | : 7,139,380 B2 | Page 1 of 1 |
| APPLICATION NO. | : 10/103918 | |
| DATED | : November 21, 2006 | |
| INVENTOR(S) | : Eric W. Burger | |

It is certified that error appears in the above-identified patent and that said Letters Patent is hereby corrected as shown below:

Column 9, claim 11, line 63, "pert on a" should read --perform a--.

Signed and Sealed this

Tenth Day of July, 2007

JON W. DUDAS
*Director of the United States Patent and Trademark Office*